(12) United States Patent
Shimada et al.

(10) Patent No.: US 6,212,755 B1
(45) Date of Patent: Apr. 10, 2001

(54) METHOD FOR MANUFACTURING INSERT-RESIN-MOLDED PRODUCT

(75) Inventors: Hiroaki Shimada, Fukui-ken; Koji Yasojima, Takefu; Shigeyuki Takeuchi, Shiga-ken, all of (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 0 days.

(21) Appl. No.: 09/156,629

(22) Filed: Sep. 18, 1998

(30) Foreign Application Priority Data

Sep. 19, 1997 (JP) .................................................. 9-255302

(51) Int. Cl.[7] .............................. B21B 1/46; B21B 13/22; B22D 11/126; B22D 11/128; B23P 17/00
(52) U.S. Cl. ...................... 29/527.1; 29/883; 264/272.15; 439/63
(58) Field of Search .................................. 29/527.1, 833, 29/874, 876, 883; 264/272.15, 271.1, 274, 275; 439/63, 581, 394

(56) References Cited

U.S. PATENT DOCUMENTS

| | | | |
|---|---|---|---|
| 2,937,409 | 5/1960 | Cole . | |
| 3,978,581 | * 9/1976 | Michisita et al. | 439/581 |
| 4,556,190 | * 12/1985 | Smith | 264/272.15 |
| 5,078,621 | * 1/1992 | Nishikawa et al. | 439/581 |
| 5,336,112 | * 8/1994 | Michisita et al. | 439/581 |
| 5,525,075 | * 6/1996 | Michisita et al. | 439/581 |
| 5,724,730 | * 3/1998 | Tanaka | 264/272.15 |

FOREIGN PATENT DOCUMENTS

| | | |
|---|---|---|
| 19620856A1 | 11/1996 | (DE) . |
| 0 545 289A1 | 6/1993 | (EP) . |
| 06190865 | 12/1994 | (JP) . |

OTHER PUBLICATIONS

European Search Report dated Nov. 30, 1999.

* cited by examiner

*Primary Examiner*—S. Thomas Hughes
*Assistant Examiner*—Jermie E. Cozart
(74) *Attorney, Agent, or Firm*—Burns, Doane, Swecker & Mathis, LLP

(57) ABSTRACT

A method for manufacturing an insert-resin-molded product prevents resin burrs from being generated. The method includes the steps of: preparing a resin-molding mold having a cavity having an inner wall including a recess formed therein; preparing a metallic member to be placed in the cavity of the resin-molding mold so as to be integrally molded with resin, the member having a metallic part to be fit into a recess of the resin-molding mold; placing the metallic member in the cavity of the resin-molding mold and fitting the metallic part of the metallic member into the recess of the resin-molding mold; and injecting resin into the cavity of the resin-molding mold to integrally insert-resin-mold with the metallic member.

11 Claims, 4 Drawing Sheets

METHOD FOR MANUFACTURING INSERT-RESIN-MOLDED PRODUCT

This application corresponds to Japanese Patent Application No. 9-255302, filed on Sep. 19, 1997, which is hereby incorporated by reference in its entirety.

BACKGROUND OF THE INVENTION

1. Field of the Invention

The present invention relates to a method for manufacturing an insert-resin-molded product which is molded by means of integrating resin with a metallic member, and a product produced thereby.

2. Description of the Related Art

A description will be given of a conventional method for manufacturing an insert-resin-molded product, with reference to FIGS. 4 through 6. The described figures and method are not "prior art," but "related art."

As shown in FIG. 4, a chip-type connector 1 is formed as an insert-resin-molded product. The connector comprises an outer conductor 2 as a first metallic member, an inner conductor 3 as a second metallic member, and resin 4 which is molded by means of integrating resin with the metallic members.

First, the outer conductor 2 and the inner conductor 3 are prepared. The former, as shown in FIG. 5, is formed by a substantially pipe-shaped cylindrical portion 6 at the center thereof, a flange-like top surface portion 7 formed at one end of the substantially pipe-shaped cylindrical portion 6, metallic parts 8a and 8b which are formed by bending the end portions of the top surface portion 7 in the direction of the substantially pipe-shaped cylindrical portion 6, and legs 9a and 9b connected to the ends of the metallic parts 8a and 8b. The metallic parts 8a and 8b have through-holes 10a and 10b disposed at approximately the respective centers thereof. The metallic parts 8a and 8b have shapes that substantially resemble the letter "U." The through-holes 10a and 10b are made by cutting out two respective portions on the top surface portion 7. A detailed description will be omitted of the inner conductor 3 shown in FIG. 4, as such a detailed description is unnecessary for the purpose of this disclosure.

Next, as shown in FIG. 6, there is prepared a resin-molding mold 32, which has a cavity 31 capable of accommodating the outer conductor 2 and the inner conductor 3. The cavity 31 is formed into a rectangular parallelepiped, at the center of which a protrusion 34 is disposed so as to be fitted into the inner periphery of the cylindrical portion 6 of the outer conductor 2. Inner walls 33 of the cavity 31 are flat, except for the region of the protrusion 34. The resin-molding mold 32 shown in FIG. 6 forms a lower mold portion. An associated upper mold portion, which is not shown in FIG. 6, is equipped with a gate for injecting resin. The upper mold portion lays flat across and encloses the upper opening 35 of the cavity 31.

Inside the cavity 31 of the resin-molding mold 32, the outer conductor 2 and the inner conductor 3 are accommodated in a state in which these components remain insulated from each other. Molten resin 4 is injected into the cavity 31 of the resin-molding mold 32 after the upper opening 35 of the cavity 31 is enclosed by the upper mold portion. After the resin 4 injected into the cavity 31 has set, the whole device is taken out from the resin-molding mold 32. A chip-type connector 1 is thereby obtained. More specifically, the device obtained is an insert-resin-molded product integrating the outer conductor 2, the inner conductor 3 and the resin 4 into a unit, as shown in FIG. 4.

As for surfaces of the chip-type connector 1, referring to FIG. 4, a description will be provided using a side surface A of the device as an example. The end portions S1 and S3 and the center portion S2 of the resin side surface, which are connected to the metallic part 8a, are formed flush with the surface of the metallic part 8a of the outer conductor 2. The side surface A of the chip-type connector 1 is made flat in conformity with the configuration of the flat inner wall 33 of the cavity 31, which corresponds to the side surface A, as shown in FIG. 6.

In the above method for manufacturing the chip type connector 1, however, when the mold is filled to excess with the molten resin 4, the resin 4 may flow over the surface of the metallic part 8a, which is flush with the resin surfaces S1, S2 and S3. As a result, the resin may be deposited on the surface of the metallic part 8a, resulting in the formation of "resin burrs" 5.

Additionally, when a configuration of the corner portion R1 of the bent metallic part 8a (shown in FIG. 5) differs from a configuration of the corresponding corner portion R2 of the cavity 31 (shown in FIG. 6), the resin 4 may flow over the surface of the corner portion of the metallic part 8a in a manner similar to that described above. Consequently, resin is deposited on the surface of the metallic part 8a, so that resin burrs 5 (Shown in FIG. 4) are generated.

SUMMARY OF THE INVENTION

The present invention has been made with a view toward solving at least the above-noted problems. Accordingly, it is an object of the present invention to provide a method for manufacturing an insert-resin-molded product, in which the generation of resin burrs on the surface of a metallic member caused by insert-resin-molding is prevented.

To this end, in accordance with the present invention, there is provided a method for manufacturing an insert-resin-molded product comprising the steps of: preparing a resin-molding mold having a cavity with an inner wall having a recess therein; preparing a metallic member to be placed in the cavity and to be integrally molded with resin, the metallic member having a metallic part which fits into the recess of the resin-molding mold; placing the metallic member in the cavity of the resin-molding mold and fitting the metallic part of the metallic member into the recess of the resin-molding mold; and, in this state, injecting resin into the cavity of the resin-molding mold to insert-resin-mold integrally with the metallic member.

Preferably, the recess of the resin-molding mold is formed in such a manner that the side surface of the recess is substantially perpendicular to the bottom surface of the same. This allows the flow of the molten resin to be substantially perpendicular to the side surface of the metallic member, so that the resin does not flow in the direction of the side surface of the metallic member, thereby, preventing resin burrs from being generated.

BRIEF DESCRIPTION OF THE DRAWINGS

The foregoing, and other, objects, features and advantages of the present invention will be more readily understood upon reading the following detailed description in conjunction with the drawings in which.

DESCRIPTION OF THE PREFERRED EMBODIMENT

Figure 1:
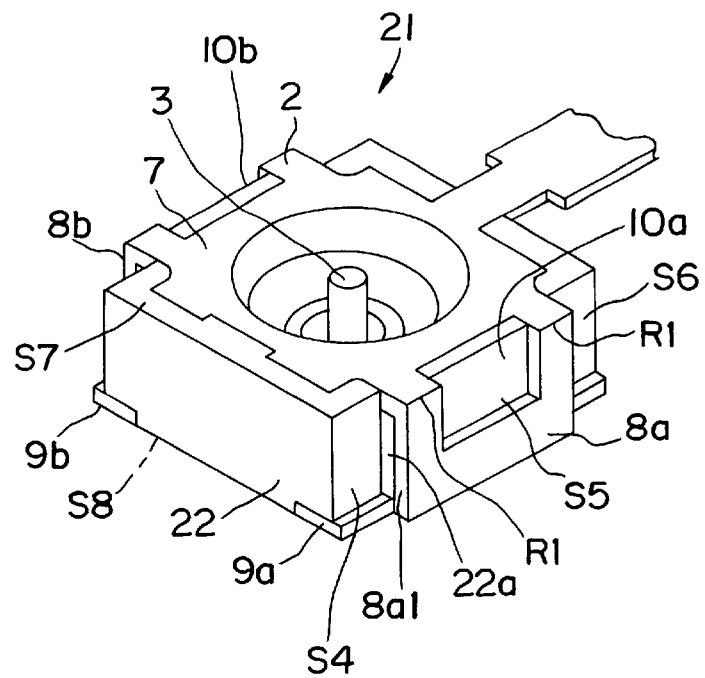
FIG. 1 is a perspective view of an exemplary insert-resin-molded product manufactured by a method according to an exemplary embodiment of the present invention.
Figure 2A:
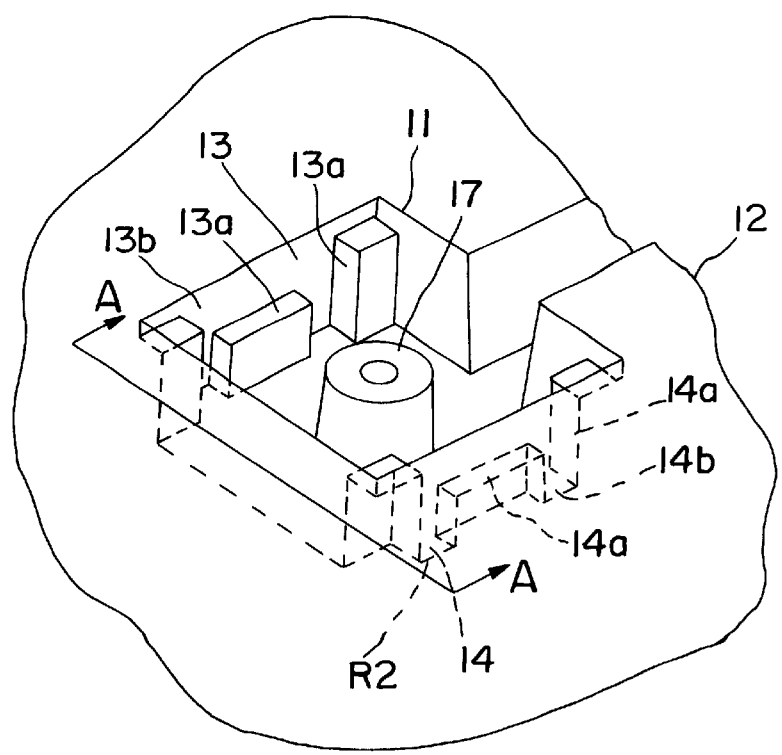
FIG. 2(a) is a perspective view of a lower mold portion of a resin-molding mold employed in the method for manufacturing the insert-resin-molded product according to the above-mentioned embodiment of the present invention.
Figure 2B:
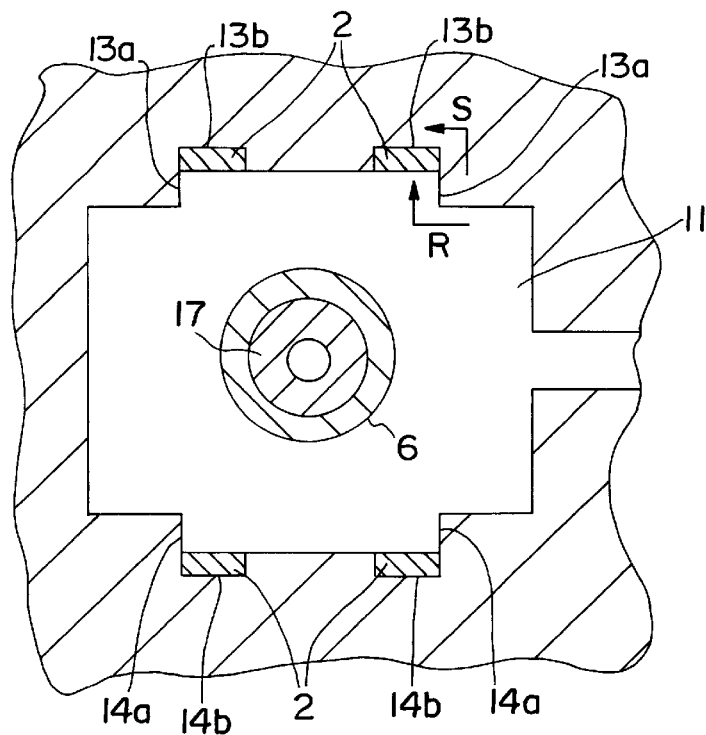
FIG. 2(b) is a cross-section of the device shown in FIG. 2(a) along line A—A, including an outer conductor accommodated in the resin-molding mold.
Figure 3:
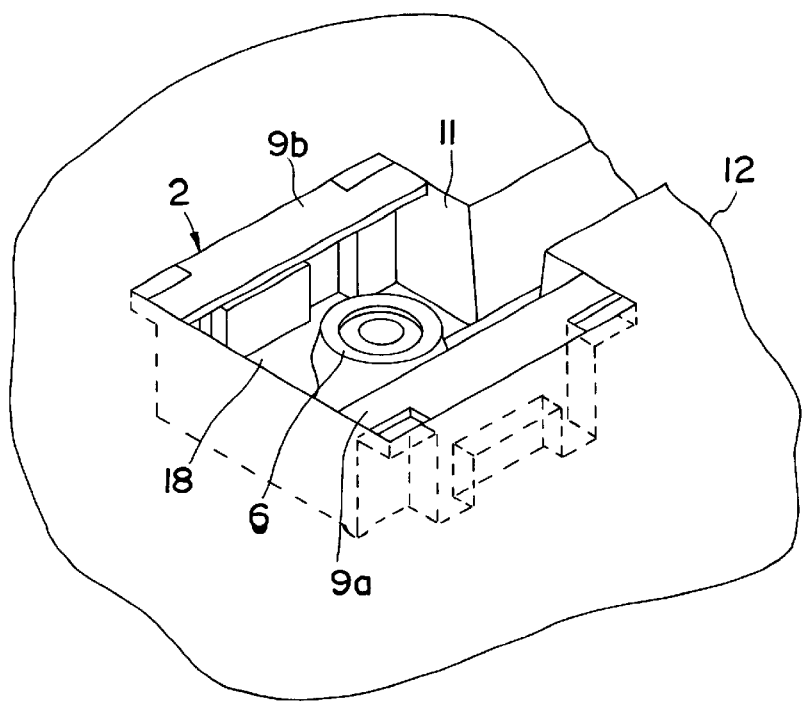
FIG. 3 is a perspective view illustrating a state in which an outer conductor is accommodated in the resin-molding mold shown in FIG. 2.
Figure 4:
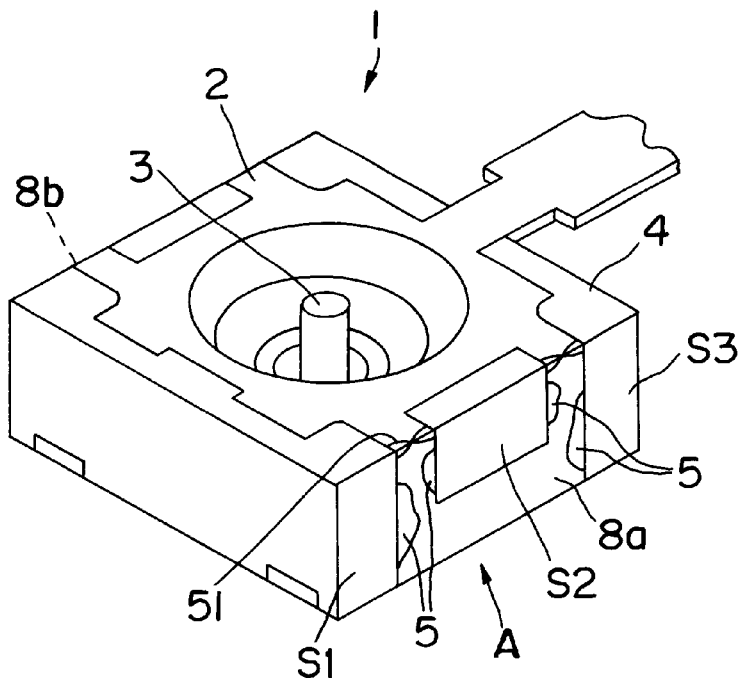
FIG. 4 is a perspective view of an insert-resin-molded product formed according to a conventional manufacturing method.
Figure 5:
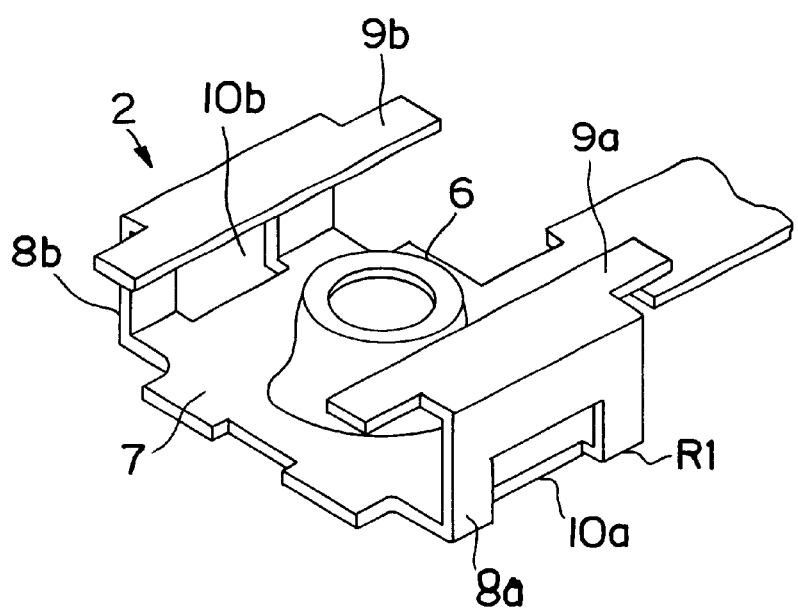
FIG. 5 is a perspective bottom view of the outer conductor used in the insert-resin-molded product shown in FIG. 1 and FIG. 4.

Referring to FIGS. 1 through 3, a detailed description will be given of an exemplary embodiment of the present invention. The parts which are the same or similar to the parts previously discussed are denoted by the same numerals, and a detailed description thereof will be omitted.

As shown in FIG. 1, there is provided a chip-type connector 21 formed as an insert-resin-molded product, which comprises an outer conductor 2 as a first metallic member, an inner conductor 3 as a second metallic member and resin 22 molded integrally with the above-identified metallic members.

First, the outer conductor 2 and the inner conductor 3, which are metallic members, are prepared.

Next, as shown in FIG. 2 (which includes FIGS. 2(a) and 2(b)), a resin-molding mold 12, which has a cavity 11 capable of accommodating the conductors 2 and 3 therein, is prepared. Through-holes 10a and 10b of the outer conductor 2 are formed to define substantially U-shaped metallic parts 8a and 8b. Substantially U-shaped recesses 13 and 14 are disposed on opposing inner walls of the cavity 11. The metallic parts 8a and 8b are respectively fit into the recesses 13 and 14. The vertical side surfaces 13a and 14a of the recesses 13 and 14 are formed almost perpendicularly to bottom surfaces 13b and 14b of the recesses 13 and 14, and more generally, all of the adjoining surfaces which form the recesses 13 and 14 can be disposed perpendicularly to each other. A protrusion 17 is disposed at the center of the cavity 11, into which an inner periphery of a substantially pipe-shaped cylindrical portion 6 is fit. A resin-molding mold 12 shown in FIG. 2 forms a lower mold portion. There is also an upper mold portion, which is not shown here, with a gate for injecting resin. The upper mold portion is placed flat across and encloses the top opening of the cavity 11.

As shown in FIG. 3, the outer conductor 2, and the inner conductor 3 (not shown) are accommodated in the cavity 11 of the resin-molding mold 12 in a state in which they remain insulated from each other. A molten resin 22 is injected into the cavity 11 of the resin-molding mold 12 after the top opening 18 of the cavity 11 is enclosed by placing the upper mold portion flat across the top opening 18.

Then, the whole device is removed from the resin-molding mold 12 after the resin 22 which has been injected into the cavity 11 has set. A chip-type connector 21 shown in FIG. 1 is thereby obtained, which comprises an insert-resin-molded product made by means of integrating the outer conductor 2, the inner conductor 3, and the resin 22 into a unit.

Figure 6:
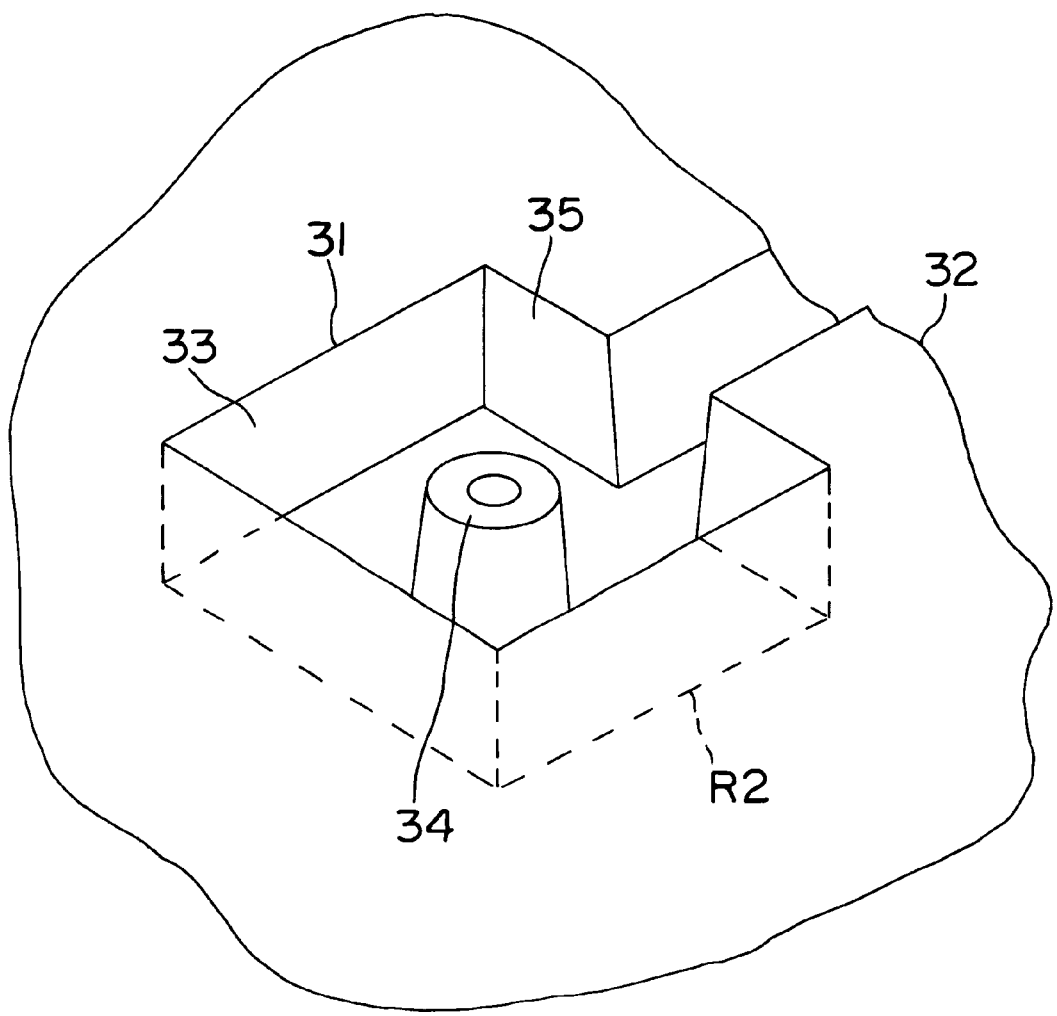
FIG. 6 is a perspective view of a lower mold portion of a resin-molding mold used in the conventional method for manufacturing an insert-resin-molded product.

Referring to FIG. 1, a description will be given of the surfaces of the chip-type connector 21, focusing on the side surface of the FIG. 1 embodiment which corresponds to the previously discussed side surface of the conventional example shown in FIG. 6.

The surface of the metallic part 8a of the outer conductor 2, and S4, S5 and S6 which are resin surface portions connected to the metallic part 8a, are not flush with each other. Namely, the metallic part 8a fitted into the recess 13 which is disposed in the cavity 11 of the resin-molding mold 12 protrudes out, and steps are formed in such a manner that the resin surface portions S4, S5 and S6 connected to the metallic part 8a are recessed with respect to the metallic part 8a.

When an insert-resin-molded product is manufactured, the filling of the cavity 11 with an excessive amount of resin 22 causes the resin 22 to be connected to an end surface 8a 1 of the metallic part 8a. Then, resin 22a flush with the end surface 8a 1 flows in the direction of the end surface 8a 1. That is, the resin 22a flows in the direction of a side surface 13a of the recess 13 of the cavity 11.

Further filling of the cavity with an excessive amount of resin allows the resin 22a to flow in a direction along the surface of the metallic part 8a. Thus, this causes the resin 22a to flow in the direction of a bottom surface 13b of the recess 13 from the side surface 13a of the recess 13 of the cavity 11.

One exemplary flow pattern of the resin may be understood with reference to FIG. 2(b), which shows a sectional view taken along the line A—A of FIG. 2(a), with the outer conductor 2 fit into the recesses 13 and 14 of the cavity 11. As indicated there, since the side surface 13a of the recess 13 is substantially perpendicular to the bottom surface 13b of the recess 13, the resin 22a changes its direction of flow in the direction of 90° to the direction of the bottom surface 13b from the direction of the side surface 13a. That is, the resin flows in the direction of the arrow "R," but does not readily flow in the direction of arrow "S." This is partly due to the fact that the metallic parts 8a are snugly accommodated in the recesses 13 and 14, and that the outer surfaces of the metallic parts 8a are separated and essentially "sealed off" from the normal flow of resin, making it unlikely that the resin can flow over the surfaces of the metallic parts 8a. As a result, resin burrs are not generated.

Also, even if a configuration R1 (shown in FIG. 1) of the corner portion of the bent metallic part 8a is not equivalent to a configuration R2 (shown in FIG. 2) of the corner portion of a cavity 11, resin 22 does not flow over the surface of the corner portion of the metallic part 8a. As a result, no resin burrs are generated, unlike the case the described above.

The method for manufacturing an insert-resin-molded product according to the present invention is not restricted to the embodiment above and can be modified in various ways without departing from the spirit and the scope of the invention. For instance, in the above embodiment, the recesses 13 and 14 are arranged respectively on the opposing side surfaces of the cavity as shown in FIG. 2. This arrangement permits formation of steps on the resin surface portions connected to the metallic parts 8a and 8b with respect to the metallic parts 8a and 8b of the outer conductor 2. However, other options are available. For example, an arrangement of a recess in the bottom surface of the cavity 11 may permit formation of a step (not shown) on the resin surface portion S7 connected to a top surface portion 7 of the outer conductor 2. Similarly, an arrangement of a recess on the top surface portion of the cavity 11 may allow a step (not shown) to be formed on a resin surface portion S8 connected to legs 9a and 9b of the outer conductor 2.

As shown in FIG. 1, the thickness of the steps between a surface of the metallic part 8a and the resin surface portions S4 and S6 may be larger than that of the metallic part 8a. The thickness of the step between the surface of the metallic part 8a and the resin surface portion S5 may be approximately the same as that of the metallic part 8a. However, this should not be construed restrictively. A thinner step portion than the thickness of the metallic part 8a can be used.

The description of the method for manufacturing an insert-resin-molded product in the embodiment above employs a chip-type connector 21, but the method is applicable to other various kinds of insert-resin-molded products.

As described above, in the method for manufacturing an insert-resin-molded product according to the present invention, a recess in an inner wall of a cavity of a resin-molding mold is arranged and the metallic part of a metallic member is fitted into the recess. This arrangement allows the route of an injected resin to be turned in the middle of the process (e.g., allows the flow of the resin to be changed in the course of the resin-filling process, such as in the manner shown in FIG. 2(b)), so that insert-resin-molding with the metallic member in an integrated manner does not permit the resin to reach the surface of the metallic member. Hence, metallic burrs are not generated.

Furthermore, metallic burrs are not generated on the surface of the metallic member, since the route of the injected resin turns in a direction substantially at a right angle in the middle of the process for reaching the surface of the metallic part.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for manufacturing an insert-resin-molded product, comprising the steps of:
   preparing a resin-molding mold having a cavity, said cavity having a first inner wall in which a first recess is formed;
   preparing a metallic member for placement in the cavity of the resin-molding mold so as to be integrally insert-resin-molded, the metallic member having a first metallic part to be fitted into the first recess of the resin-molding mold;
   placing the metallic member in the cavity and fitting the first metallic part of the metallic member into the first recess of the resin-molding mold; and
   injecting resin into the cavity of the resin-molding mold to integrally insert-resin-mold with the metallic member.

2. A method for manufacturing an insert-resin-molded product according to claim 1, wherein a side surface of the first recess of the resin-molding mold is formed substantially perpendicular to a bottom surface of the first recess.

3. A method for manufacturing an insert-resin-molded product according to claim 2, wherein said first metallic part fits into said first recess such that an outer surface of said first metallic part is sealed off from the flow of resin within said cavity, thereby preventing the formation of resin burrs on said outer surface of said first metallic part.

4. A method for manufacturing an insert-resin-molded product according to claim 1, wherein the first recess has a substantially U-shape.

5. A method for manufacturing an insert-resin-molded product according to claim 1, wherein a protrusion is disposed at the center of the cavity, into which an inner periphery of a substantially pipe-shaped cylindrical portion of the metallic member is fitted.

6. A method for manufacturing an insert-resin-molded product according to claim 1, further including a second recess, wherein the first and second recesses are arranged respectively on opposing inner walls of the cavity.

7. A method for manufacturing an insert-resin-molded product according to claim 1, wherein the metallic member is formed by a substantially pipe-shaped cylindrical portion at the center thereof, and includes a flanged top surface portion at one end of the substantially pipe-shaped cylindrical portion.

8. A method for manufacturing an insert-resin-molded product according to claim 7, wherein said first metallic part is formed by bending an end portion of the top surface portion in the direction of the substantially pipe-shaped cylindrical portion.

9. A method for manufacturing an insert-resin-molded product according to claim 8, wherein said first metallic part has a through-hole disposed at approximately the center thereof.

10. A method for manufacturing an insert-resin molded product according to claim 1, wherein the first metallic part of the metallic member is fitted into the first recess formed inside the inner wall of the cavity such that the metallic part defines steps with respect to the first recess.

11. A method for manufacturing an insert-resin molded product according to claim 1, wherein the resin is injected into the cavity such that steps are formed to be recessed with respect to the first metallic part.

* * * * *